US009128362B2

United States Patent
Shin

(10) Patent No.: US 9,128,362 B2
(45) Date of Patent: Sep. 8, 2015

(54) IMAGE DISPLAYING DEVICE

(75) Inventor: In Hee Shin, Gwangju-si (KR)

(73) Assignee: ELECTRONICS AND TELECOMMUNICATIONS RESEARCH INSTITUTE, Daejeon (KR)

( * ) Notice: Subject to any disclaimer, the term of this patent is extended or adjusted under 35 U.S.C. 154(b) by 865 days.

(21) Appl. No.: 13/301,163

(22) Filed: Nov. 21, 2011

(65) Prior Publication Data

US 2012/0127219 A1 May 24, 2012

(30) Foreign Application Priority Data

Nov. 23, 2010 (KR) ........................ 10-2010-0116979

(51) Int. Cl.
| G02B 27/14 | (2006.01) |
| G02B 3/00 | (2006.01) |
| G03B 21/20 | (2006.01) |
| F21V 8/00 | (2006.01) |
| G03B 33/12 | (2006.01) |
| G02B 6/42 | (2006.01) |

(52) U.S. Cl.
CPC .......... *G03B 21/2033* (2013.01); *G02B 6/0006* (2013.01); *G03B 21/208* (2013.01); *G03B 33/12* (2013.01); *G02B 6/0008* (2013.01); *G02B 6/4215* (2013.01); *G02B 6/4298* (2013.01)

(58) Field of Classification Search
USPC .......................................... 359/630–639, 642
See application file for complete search history.

(56) References Cited

U.S. PATENT DOCUMENTS

| 4,725,131 | A | 2/1988 | Goodwin et al. |
| 5,067,799 | A | 11/1991 | Gold et al. |
| 6,236,799 | B1 * | 5/2001 | Huh et al. ...................... 385/147 |
| 6,590,714 | B2 | 7/2003 | Sugawara |
| 7,001,022 | B2 * | 2/2006 | Kim et al. ....................... 353/31 |
| 7,167,315 | B2 | 1/2007 | Watson et al. |
| 7,656,585 | B1 | 2/2010 | Powell et al. |
| 7,667,238 | B2 * | 2/2010 | Erchak et al. ................... 257/98 |

FOREIGN PATENT DOCUMENTS

| KR | 2000-0000807 | 1/2000 |
| KR | 10-0297424 | 10/2001 |
| KR | 2003-0037567 | 5/2003 |
| KR | 10-0826021 | 4/2008 |
| KR | 10-2009-0005655 | 1/2009 |

* cited by examiner

*Primary Examiner* — Mohammed Hasan

(74) *Attorney, Agent, or Firm* — Staas & Halsey LLP

(57) ABSTRACT

Disclosed is an image display device which includes a light mixer configured to mix first and second lights generated from first and second light sources, respectively; and a wave guide configured to guide lights emitted from the light mixer and to emit the guided lights to the exterior.

13 Claims, 9 Drawing Sheets

IMAGE DISPLAYING DEVICE

CROSS-REFERENCE TO RELATED APPLICATIONS

This application claims the benefits, under 35 U.S.C §119, of Korean Patent Application No. 10-2010-0116979 filed Nov. 23, 2010, the entirety of which is incorporated by reference herein.

BACKGROUND

Exemplary embodiments relate to an electronic device, and more particularly, relate to an image displaying device.

With the advancement of the optical technology, image display devices capable of emitting images by a light have been developed. For example, such image display devices include a projector, a beam projector, a holographic device, etc.

Display using the emission of light-type images includes mixing and aligning lights. Upon mixing of lights, there are mixed lights having different intensities and colors. Upon aligning of lights, mixed lights may be controlled to be emitted to the same area. A light with a required color may be emitted from an image display device by mixing and aligning lights.

If lights are not aligned normally, not only a required color but also an original color of a light source are emitted from the image display device. This means that the quality of an image displayed by the image display device is lowered.

SUMMARY

One aspect of embodiments of the inventive concept is directed to provide an image display device comprising a light mixer configured to mix first and second lights generated from first and second light sources, respectively; and a wave guide configured to guide lights emitted from the light mixer and to emit the guided lights to the exterior.

In this embodiment, the first and second lights have different colors.

In this embodiment, the light mixer comprises a first focusing lens which is configured to focus the first light to be incident on the wave guide.

In this embodiment, the light mixer comprises a second focusing lens which is configured to focus the second light to be incident on the wave guide.

In this embodiment, the first light source is configured to emit the first light along a first axis proceeding to the wave guide from the first light source, and the second light source is configured to emit the second light along a second axis intersecting the first axis.

In this embodiment, the light mixer comprises a first dichroic filter configured to pass the first light generated by the first light source to the wave guide and to reflect the second light generated by the second light source to the wave guide.

In this embodiment, the light mixer further comprises a third light source configured to generate a third light having a color different from colors of the first and second lights and to emit the third light along a third axis intersecting the first axis.

In this embodiment, the light mixer further comprises a second dichroic filter configured to pass the first and second lights transmitted from the first dichroic filter to the wave guide and to reflect the third light generated by the third light source to the wave guide.

In this embodiment, the light mixer further comprises a focusing lens configured to focus the third light generated by the third light source to be incident on the wave guide.

In this embodiment, the first, second, and third lights correspond to green, red, and blue, respectively.

In this embodiment, the image display device further comprises a collimation lens configured to collimate a light emitted from the wave guide.

In this embodiment, the wave guide is an optical fiber.

In this embodiment, the light mixer and the wave guide form a hand-held beam projector.

In this embodiment, the first and second light sources are configured to adjust intensities of the first and second lights in response to first and second control signals.

BRIEF DESCRIPTION OF THE FIGURES

The above and other objects and features will become apparent from the following description with reference to the following figures, wherein like reference numerals refer to like parts throughout the various figures unless otherwise specified, and wherein.

DETAILED DESCRIPTION

Figure 1:
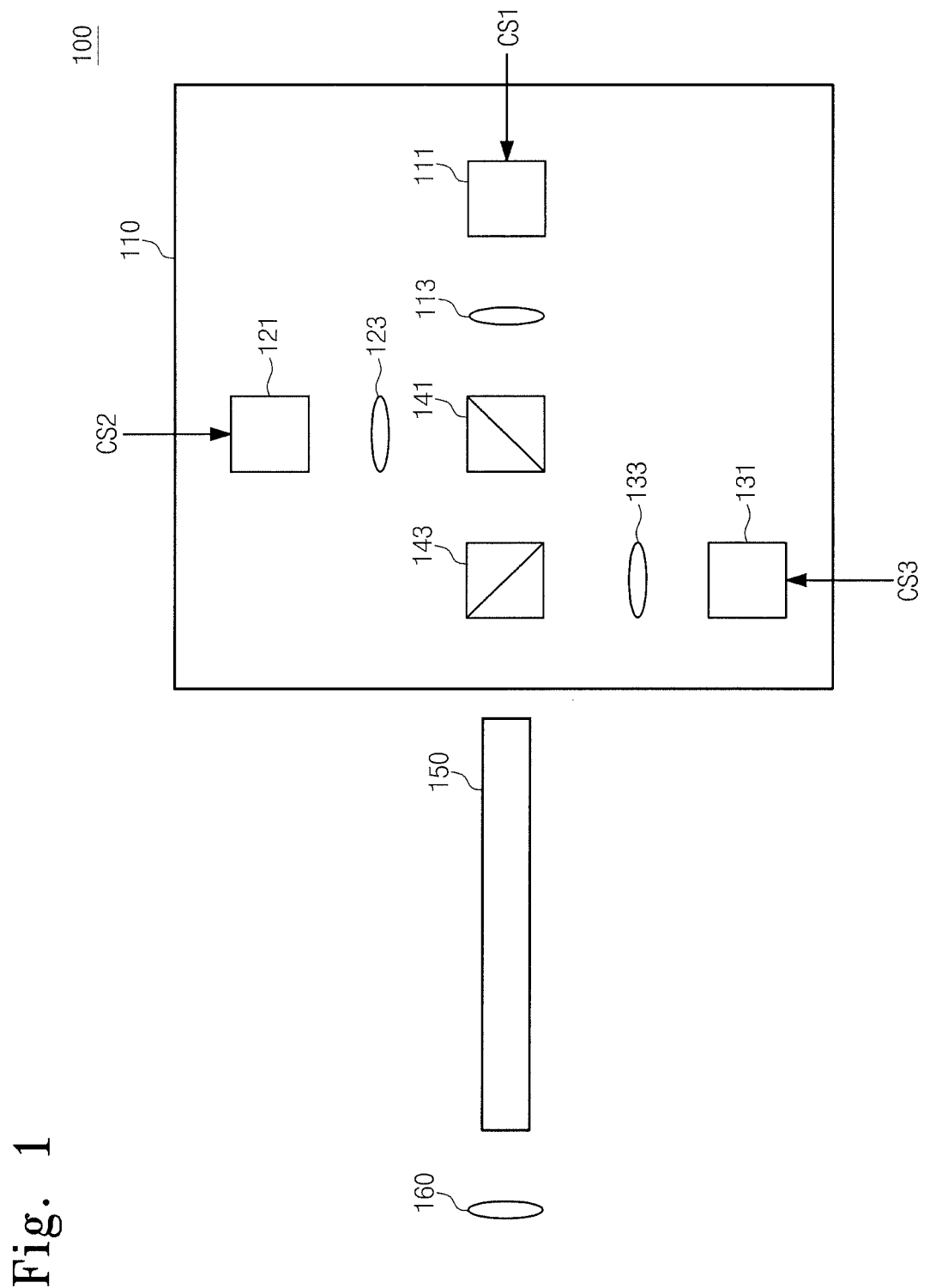
FIG. 1 is a block diagram illustrating an image display device according to an embodiment of the inventive concept.

The inventive concept is described more fully hereinafter with reference to the accompanying drawings, in which embodiments of the inventive concept are shown. This inventive concept may, however, be embodied in many different forms and should not be construed as limited to the embodiments set forth herein. Rather, these embodiments are provided so that this disclosure will be thorough and complete, and will fully convey the scope of the inventive concept to those skilled in the art. In the drawings, the size and relative sizes of layers and regions may be exaggerated for clarity. Like numbers refer to like elements throughout.

It will be understood that, although the terms first, second, third etc. may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section discussed below could be termed a second element, component, region, layer or section without departing from the teachings of the inventive concept.

Spatially relative terms, such as "beneath", "below", "lower", "under", "above", "upper" and the like, may be used herein for ease of description to describe one element or feature's relationship to another element(s) or feature(s) as illustrated in the figures. It will be understood that the spatially relative terms are intended to encompass different orientations of the device in use or operation in addition to the orientation depicted in the figures. For example, if the device in the figures is turned over, elements described as "below" or "beneath" or "under" other elements or features would then be oriented "above" the other elements or features. Thus, the exemplary terms "below" and "under" can encompass both an orientation of above and below. The device may be otherwise oriented (rotated 90 degrees or at other orientations) and the spatially relative descriptors used herein interpreted accordingly. In addition, it will also be understood that when a layer is referred to as being "between" two layers, it can be the only layer between the two layers, or one or more intervening layers may also be present.

The terminology used herein is for the purpose of describing particular embodiments only and is not intended to be limiting of the inventive concept. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items.

It will be understood that when an element or layer is referred to as being "on", "connected to", "coupled to", or "adjacent to" another element or layer, it can be directly on, connected, coupled, or adjacent to the other element or layer, or intervening elements or layers may be present. In contrast, when an element is referred to as being "directly on," "directly connected to", "directly coupled to", or "immediately adjacent to" another element or layer, there are no intervening elements or layers present.

Unless otherwise defined, all terms (including technical and scientific terms) used herein have the same meaning as commonly understood by one of ordinary skill in the art to which this inventive concept belongs. It will be further understood that terms, such as those defined in commonly used dictionaries, should be interpreted as having a meaning that is consistent with their meaning in the context of the relevant art and/or the present specification and will not be interpreted in an idealized or overly formal sense unless expressly so defined herein.

FIG. 1 is a block diagram illustrating an image display device according to an embodiment of the inventive concept. Referring to FIG. 1, an image display device 100 may include a light mixer 110, a wave guide 150, and a lens 160. The light mixer 110 may be configured to mix at least two lights.

The wave guide 150 may be configured to guide mixed lights emitted from the light mixer 110. When the mixed lights emitted from the light mixer 110 are guided via the wave guide 150, the mixed lights may be aligned. That is, the wave guide 150 may be used to align the mixed lights emitted from the light mixer 110.

The lens 160 may be configured to collimate mixed lights emitted from the light mixer 110. That is, the lens 160 may be a collimation lens.

The light mixer 110 may include a first light source 111, a first lens 113, a second light source 121, a second lens 123, a third light source 131, a third lens 133, a first dichroic filter 141, and a second dichroic filter 143.

The first light source 111 may be configured to emit a first light in response to a first control signal CS1. The first light may be transferred to the first lens 113 from the first light source 111. That is, the first light source 111 may be configured to emit the first light along the same axis (or, shaft line) as that provided by the wave guide 150.

The first light source 111 may be configured to control the intensity of the first light in response to the first control signal CS1. The first light source 111 may control the intensity of the first light according to the amount of current or a voltage level of the first control signal CS1.

In an embodiment, the first light source 111 may be a Light Emitting Diode (LED) or a Laser Diode (LD). The first light emitted from the first light source 111 may be green.

The first lens 113 may be configured to focus the first light emitted from the first light source 111. That is, the first lens 113 may be a focusing lens. In an embodiment, the first lens 113 may focus the first light from the first light source to as to be incident on the wave guide 150. That is, the first lens 113 may control the first light so as to be incident on a core of the wave guide 150.

The second light source 121 may be configured to emit a second light in response to a second control signal CS2. The second light CS2 may be sent to the second lens 123 from the second light source 121. That is, the second light source 121 may be configured to emit the second light along an axis (or, shaft line) crossing (or, vertical to) an axis provided by the wave guide 150.

The second light source 121 may be configured to control the intensity of the second light in response to the second control signal CS2. The second light source 121 may control the intensity of the second light according to the amount of current or a voltage level of the second control signal CS2.

In an embodiment, the second light source 121 may be a Light Emitting Diode (LED) or a Laser Diode (LD). The second light emitted from the second light source 121 may be red.

The second lens 123 may be configured to focus the second light emitted from the second light source 121. That is, the second lens 123 may be a focusing lens. In an embodiment, the second lens 123 may focus the second light from the second light source 121 to as to be incident on the wave guide 150. That is, the second lens 123 may control the first light so as to be incident on a core of the wave guide 150.

The third light source 131 may be configured to emit a third light in response to a third control signal CS3. The third light CS3 may be sent to the third lens 133 from the third light source 131. That is, the third light source 131 may be configured to emit the third light along an axis (or, shaft line) crossing (or, vertical to) an axis provided by the wave guide 150.

The third light source 131 may be configured to control the intensity of the third light in response to the third control signal CS3. The third light source 131 may control the intensity of the third light according to the amount of current or a voltage level of the third control signal CS3.

In an embodiment, the third light source 131 may be a Light Emitting Diode (LED) or a Laser Diode (LD). The third light emitted from the second light source 121 may be blue.

The third lens 133 may be configured to focus the third light emitted from the third light source 131. That is, the third lens 133 may be a focusing lens. In an embodiment, the third lens 133 may focus the third light from the third light source 131 to as to be incident on the wave guide 150. That is, the third lens 133 may control the first light so as to be incident on a core of the wave guide 150.

The first dichroic filter 141 may be configured to pass the first light emitted from the first light source 111 to the wave guide 150 and to reflect the second light emitted from the second light source 121 to the wave guide 150.

The second dichroic filter 143 may be configured to pass a light transmitted from the first dichroic filter 141 to the wave guide 150 and to reflect the third light emitted from the third light source 131 to the wave guide 150.

Figure 2:
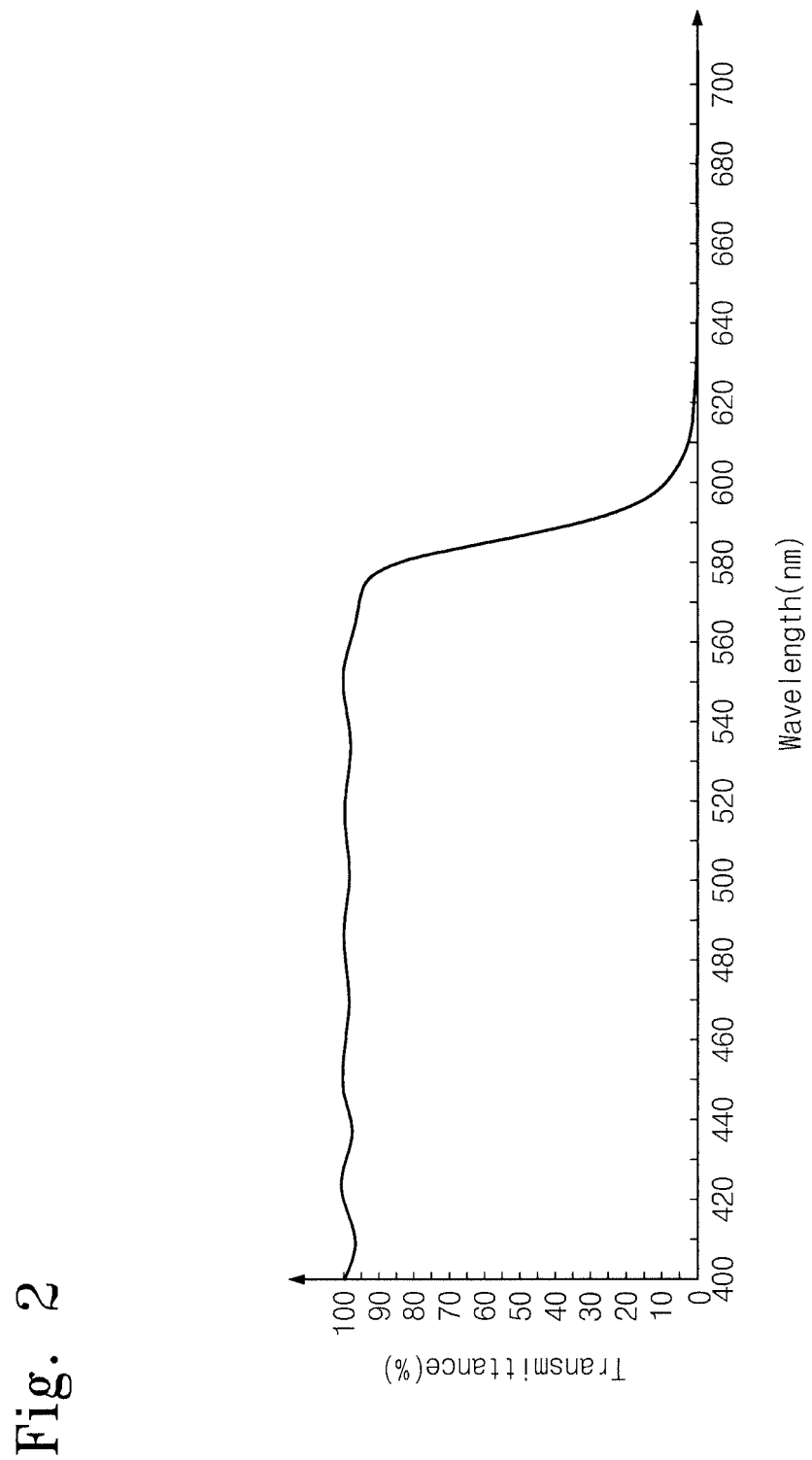
FIG. 2 is a graph illustrating the transmittance of a first dichroic filter in FIG. 1.

FIG. 2 is a graph illustrating the transmittance of a first dichroic filter in FIG. 1. In FIG. 2, a horizontal axis represents a wavelength, and a vertical axis represents the transmittance. Referring to FIG. 2, a light having a wavelength corresponding to red may be reflected by a first dichroic filter 141. A light having a wavelength corresponding to green may be reflected by the first dichroic filter 141. That is, the first light (e.g., a green light) emitted from a first light source 111 may pass the first dichroic filter 141, and the second light (e.g., a red light) emitted from a second light source 121 may be reflected by the first dichroic filter 141.

Figure 3:
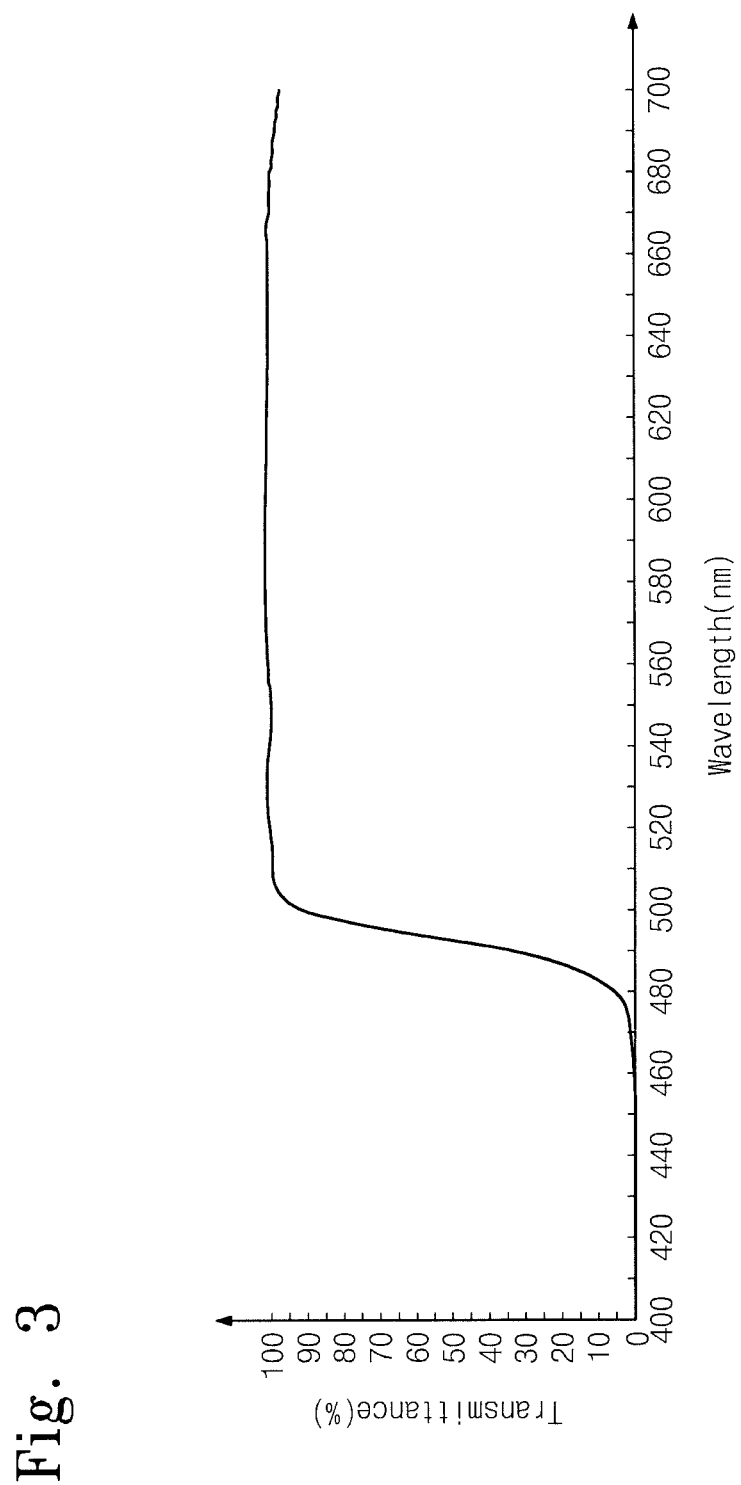
FIG. 3 is a graph illustrating the transmittance of a second dichroic filter in FIG. 1.

FIG. 3 is a graph illustrating the transmittance of a second dichroic filter in FIG. 1. In FIG. 3, a horizontal axis represents a wavelength, and a vertical axis represents the transmittance. Referring to FIG. 3, a light having a wavelength corresponding to blue may be reflected by a second dichroic filter 143. Lights having wavelengths corresponding to red and green may pass the second dichroic filter 143. That is, first and second lights (e.g., green and red lights) emitted from first and second light sources 111 and 121 may pass the second dichroic filter 143, and a third light (e.g., a blue light) emitted from a third light source 131 may be reflected by the second dichroic filter 143.

Figure 4:
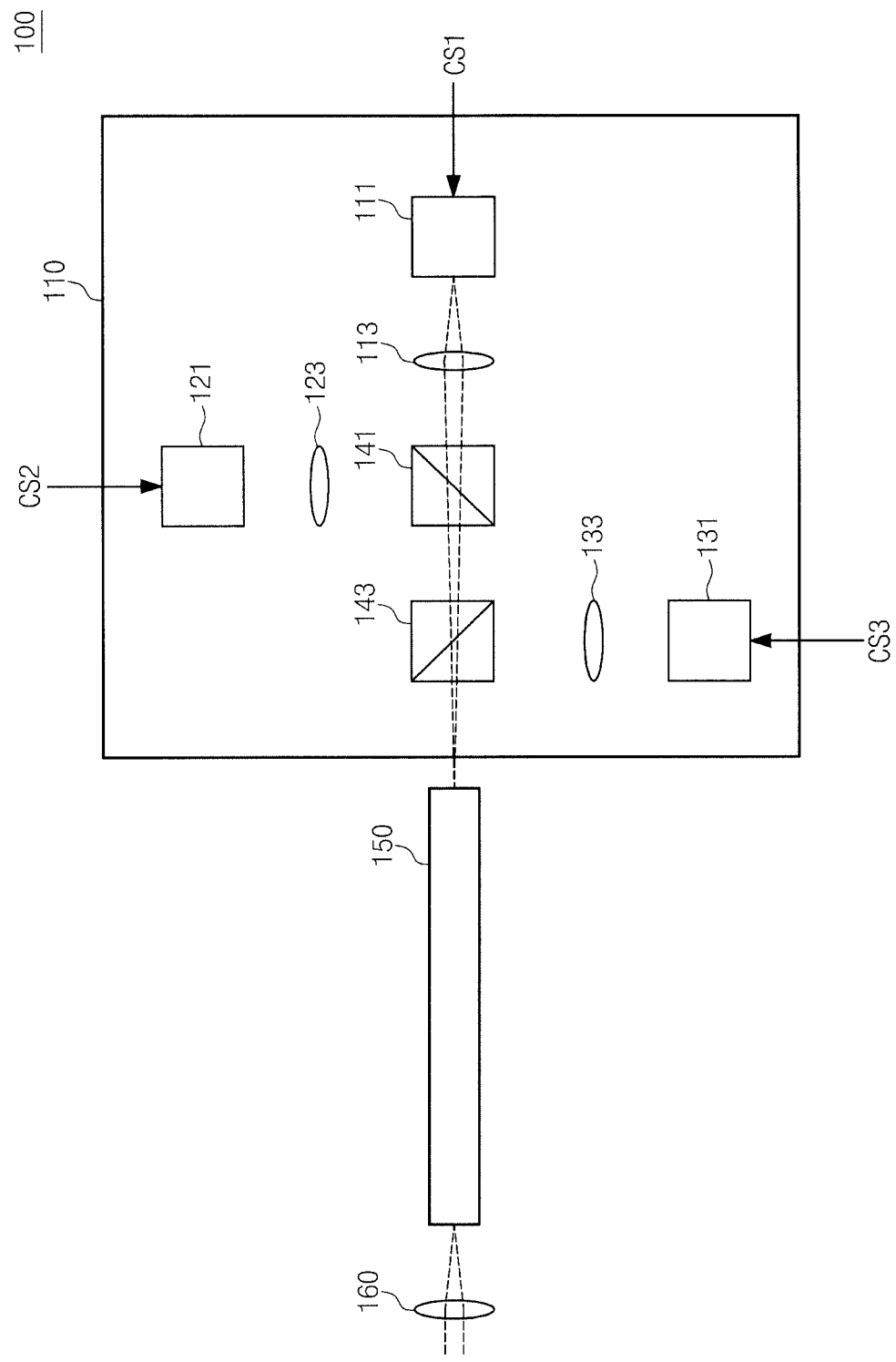
FIG. 4 is a block diagram illustrating a transmission path of a first light emitted from a first light in an image display device in FIG. 1.

FIG. 4 is a block diagram illustrating a transmission path of a first light emitted from a first light in an image display device in FIG. 1. Referring to FIG. 4, a first light emitted from a first light source 111 may be diffused. When the first light passes through a first lens 113, the first light may be focused. The first light may pass first and second dichroic filters 141 and 143 to be incident on a wave guide 150. In an embodiment, the first lens 113 may control the first light such that the first light is focused at an incident surface of the wave guide 150.

The first light incident on the wave guide 150 may be guided by the wave guide 150. The first light may be emitted from an end of the wave guide 150. The first light emitted from the wave guide 150 may be collimated by a lens 160.

Figure 5:
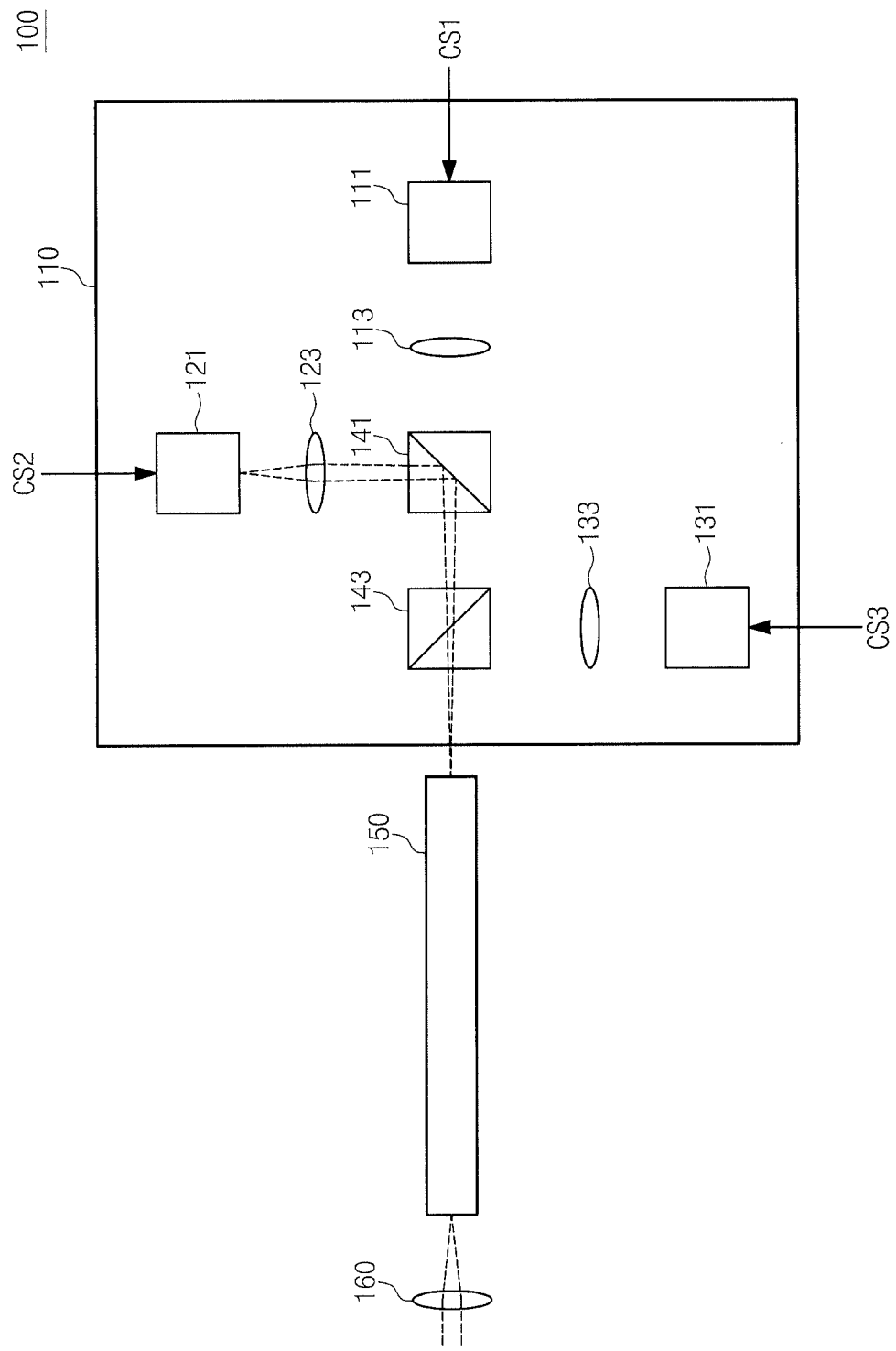
FIG. 5 is a block diagram illustrating a transmission path of a second light emitted from a first light in an image display device in FIG. 1.

FIG. 5 is a block diagram illustrating a transmission path of a second light emitted from a first light in an image display device in FIG. 1. Referring to FIG. 5, a second light emitted from a second light source 121 may be diffused. When the second light passes through a second lens 123, the second light may be focused. The second light may be reflected by a first dichroic filter 141. The second light reflected by the first dichroic filter 141 may pass a second dichroic filter 143 to be incident on a wave guide 150. In an embodiment, the second lens 123 may control the second light such that the second light is focused at an incident surface of the wave guide 150.

The second light incident on the wave guide 150 may be guided by the wave guide 150. The second light may be emitted from an end of the wave guide 150. The second light emitted from the wave guide 150 may be collimated by a lens 160.

Figure 6:
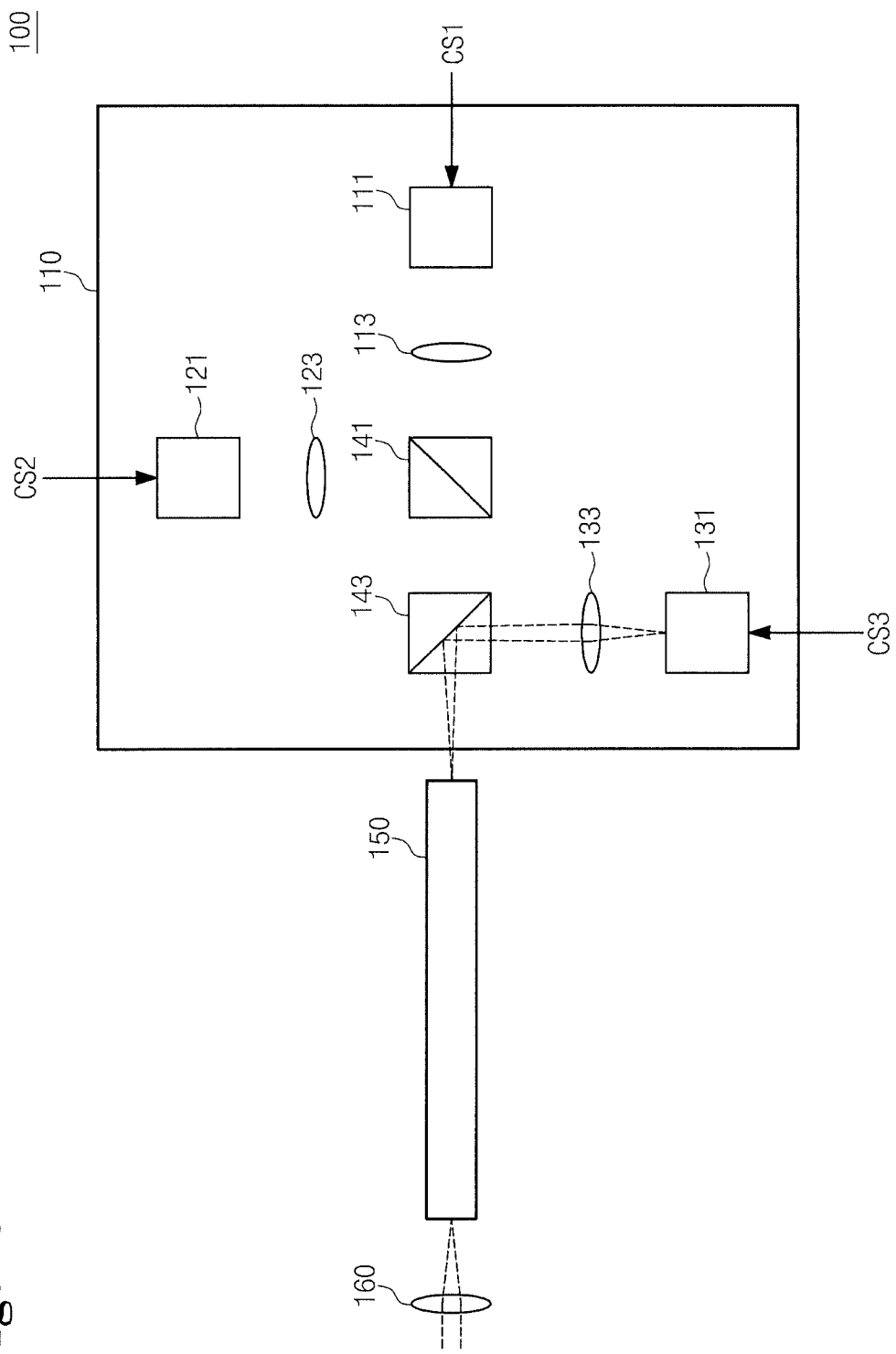
FIG. 6 is a block diagram illustrating a transmission path of a third light emitted from a first light in an image display device in FIG. 1.

FIG. 6 is a block diagram illustrating a transmission path of a third light emitted from a first light in an image display device in FIG. 1. Referring to FIG. 6, a third light emitted from a third light source 131 may be diffused. When the third light passes through a third lens 133, the third light may be focused. The third light may be reflected by a second dichroic filter 143 to be incident on a wave guide 150. In an embodiment, the third lens 133 may control the third light such that the third light is focused at an incident surface of the wave guide 150.

The third light incident on the wave guide 150 may be guided by the wave guide 150. The third light may be emitted from an end of the wave guide 150. The third light emitted from the wave guide 150 may be collimated by a lens 160.

As above described, first to third lights emitted from first to third light sources 111, 121, and 131 may be focused to be incident on a wave guide 150. That is, a light mixer 110 may be configured to mix and focus the first to third lights so as to be incident on the wave guide 150.

Mixed lights of the first to third lights may be guided by the wave guide 150. At this time, the mixed lights of the first to third lights may be aligned. For example, the mixed lights of the first to third lights may be aligned according to a shape of a core of the wave guide 150. The aligned mixed lights of the first to third lights may be emitted from the wave guide 150. The aligned mixed lights of the first to third lights may be collimated by a lens 160.

In accordance with embodiments of the inventive concept, lights having different colors may be mixed and aligned. Accordingly, an image display device 100 with an improved image display function may be provided. Further, since light alignment is made by a low-priced wave guide 150, it is possible to provide a low-priced image display device 100.

As shown in FIGS. 1 and 4 to 6, light sources 111 to 131 are placed on different positions and configured to emit lights toward different directions to prevent cross-talk phenomena. If the light sources 111 to 131 are placed closely, an electric signal, which is provided to one of the light sources 111 to 131, may affect other light sources. This is called the cross-talk phenomena. The light sources 111 to 131 may be placed on different positions and emit lights toward different directions to prevent this cross-talk phenomena.

Figure 7:
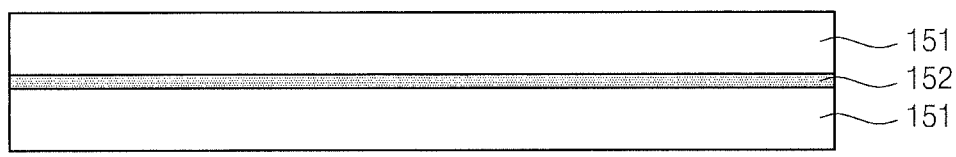
FIG. 7 is a diagram illustrating a wave guide according to an embodiment of the inventive concept.

FIG. 7 is a diagram illustrating a wave guide according to an embodiment of the inventive concept. Referring to FIG. 7, a wave guide 150a may include an optical fiber core 152 and an optical fiber clad 151 surrounding the optical fiber core 152. In an embodiment, a diameter of the optical fiber 151 may be below about 4 micrometers. That is, the wave guide 150a may be a single mode optical fiber.

Figure 8:
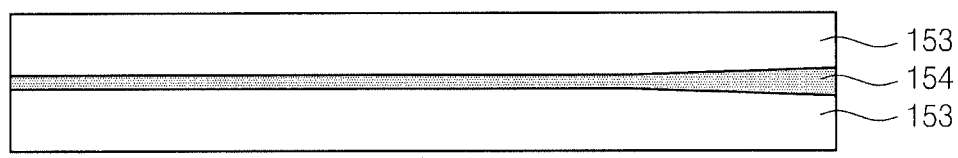
FIG. 8 is a diagram illustrating a wave guide according to another embodiment of the inventive concept.

FIG. 8 is a diagram illustrating a wave guide according to another embodiment of the inventive concept. Referring to FIG. 8, a wave guide 150b may include an optical fiber core 154 and an optical fiber clad 153 surrounding the optical fiber core 154. In an embodiment, the optical fiber 154 may include a thermally expanded area having a diameter over about 4 micrometers. That is, the wave guide 150b may be a thermally expanded optical fiber.

Figure 9:
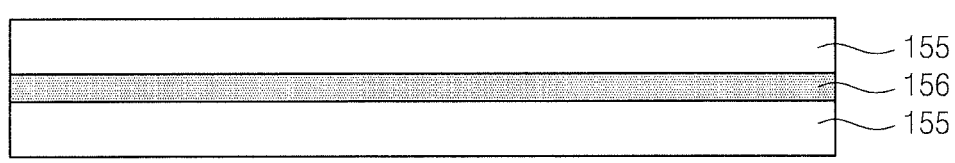
FIG. 9 is a diagram illustrating a wave guide according to still another embodiment of the inventive concept.

FIG. 9 is a diagram illustrating a wave guide according to still another embodiment of the inventive concept. Referring to FIG. 9, a wave guide 150c may include an optical fiber core 156 and an optical fiber clad 155 surrounding the optical fiber core 156. In an embodiment, a diameter of the optical fiber 156 may be over about 4 micrometers. That is, the wave guide 150c may be a multi-mode optical fiber.

Figure 10:
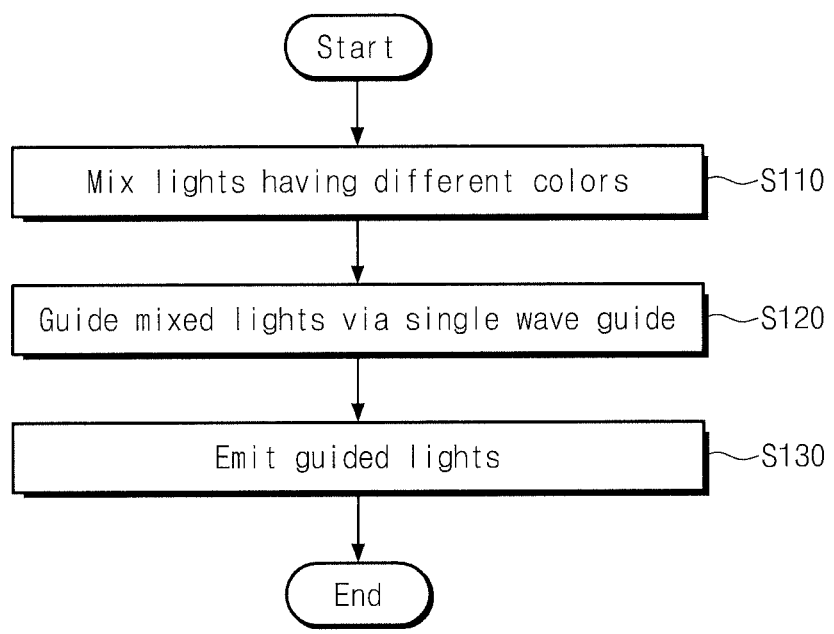
FIG. 10 is a flowchart illustrating an image display method according to an embodiment of the inventive concept.

FIG. 10 is a flowchart illustrating an image display method according to an embodiment of the inventive concept. Referring to FIGS. 1 and 10, in operation S110, lights with different colors may be mixed. In an embodiment, lights with different colors may be mixed by a light mixer 110.

In operation S120, mixed lights may be guided via a single wave guide. The light mixer 110 may focus the mixed lights to be incident on a wave guide 150. The wave guide 150 may guide incident lights. At this time, mixed lights may be aligned.

In operation S130, the guided lights may be emitted. The wave guide 150 may emit the guided lights to the exterior via a lens 160.

Figure 11:
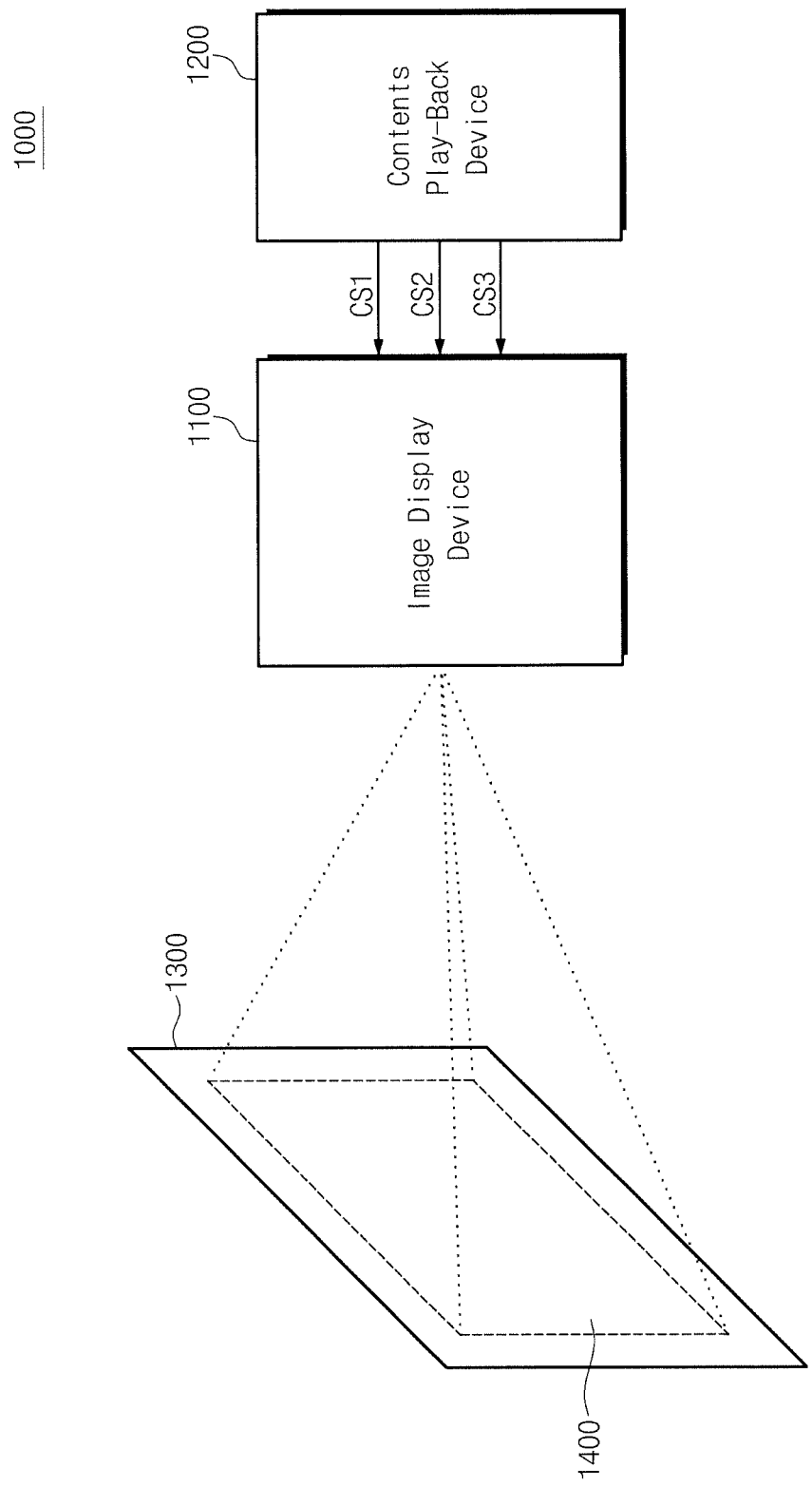
FIG. 11 is a block diagram illustrating an image display system according to an exemplary embodiment of the inventive concept.

FIG. 11 is a block diagram illustrating an image display system according to an exemplary embodiment of the inventive concept. Referring to FIG. 11, an image display system 1000 may include an image display device 1100, a contents play-back device 1200, and a display device 1300.

In an embodiment, the image display device 1100 may be identical to an image display device 100 described with reference to FIGS. 1 to 10. In another embodiment, the image display device 1100 may include a plurality of image display devices each of which is configured to identical to that 100 described with reference to FIGS. 1 to 10. For example, the image display device 1100 may include an array structure where an image display device 100 described with reference to FIGS. 1 to 10 is provided in plurality.

The contents play-back device 1200 may be configured to control first to third control signals CS1 to CS3 based upon the specific contents. That is, the contents play-back device 1200 may be configured to play back the specific contents via the image display device 1100.

The display device 1300 may display lights emitted by the image display device 1100 as an image 1400.

In an embodiment, the contents play-back device 1200 may be a hand-held device such as a cellular phone, a smart phone, a tablet, a netbook, a notebook, etc. The image display device 1100 may be a hand-held beam projector. The display device 1300 may be a screen.

The contents play-back device 1200 may be an arithmetic component such as a processor. The image display device 1100 may be a liquid crystal panel. The display device 1300 may be a glass of a monitor.

The above-disclosed subject matter is to be considered illustrative, and not restrictive, and the appended claims are intended to cover all such modifications, enhancements, and other embodiments, which fall within the true spirit and scope. Thus, to the maximum extent allowed by law, the scope is to be determined by the broadest permissible interpretation of the following claims and their equivalents, and shall not be restricted or limited by the foregoing detailed description.

What is claimed is:

1. An image display device comprising:
a light mixer configured to mix a first light and a second light generated from a first light source and a second light source, respectively; and
a single wave guide configured to guide the mixed lights emitted from the light mixer and to emit guided lights to the exterior,
wherein:
a color of the first light is different from a color of the second light,
the first light source is configured to emit the first light along a first axis preceding the wave guide and the second light source is configured to emit the second light along a second axis preceding the wave guide, and
the second axis intersects the first axis.

2. The image display device of claim 1, wherein the light mixer comprises a first focusing lens which is configured to focus the first light to be incident on the wave guide.

3. The image display device of claim 1, wherein the light mixer comprises a second focusing lens which is configured to focus the second light to be incident on the wave guide.

4. The image display device of claim 1, wherein the light mixer comprises: a first dichroic filter configured to pass the first light generated by the first light source to the wave guide and to reflect the second light generated by the second light source to the wave guide.

5. The image display device of claim 4, wherein the light mixer further comprises:
a third light source configured to generate a third light having a color different from the color of the first light and the color of the second light and to emit the third light along a third axis preceding the wave guide and intersecting the first axis.

6. The image display device of claim 5, wherein the light mixer further comprises:
a second dichroic filter configured to pass the first light and the second light transmitted from the first dichroic filter to the wave guide and to reflect the third light generated by the third light source to the wave guide.

7. The image display device of claim 5, wherein the light mixer further comprises:
a focusing lens configured to focus the third light generated by the third light source to be incident on the wave guide.

8. The image display device of claim 5, wherein the first light, the second light, and third light correspond to green, red, and blue, respectively.

9. The image display device of claim 5, wherein the first axis, the second axis and the third axis are different axes.

10. The image display device of claim 1, further comprising:
a collimation lens configured to collimate a light emitted from the wave guide.

11. The image display device of claim 1, wherein the wave guide is an optical fiber.

12. The image display device of claim 1, wherein the light mixer and the wave guide form a hand-held beam projector.

13. The image display device of claim 1, wherein the first light source, the second light source, and the third light source are configured to adjust intensities of the first light, the second light, and the third light in response to a first control signal, a second control signal, and third control signal.

* * * * *